April 23, 1957 R. C. CREELMAN 2,789,386
TROLLING DEVICES

Filed Sept. 10, 1954 2 Sheets-Sheet 1

INVENTOR.
RAYMOND C. CREELMAN
BY
Reynolds, Beach & Christensen
ATTORNEYS

INVENTOR.
RAYMOND C. CREELMAN
BY
ATTORNEYS

United States Patent Office 2,789,386
Patented Apr. 23, 1957

2,789,386

TROLLING DEVICES

Raymond C. Creelman, Bremerton, Wash.

Application September 10, 1954, Serial No. 455,188

15 Claims. (Cl. 43—43.03)

This invention relates to a novel device for use in fishing by the method commonly referred to as "trolling," a technique in which the fishing lure is drawn through the water on the end of a trolling line at selected speed. More specifically, the invention comprises a device by which the fishing lure which may be the device itself but which is preferably a separate element serving in lieu of a trolling sinker, is caused to move up and down in depth automatically and in a periodic manner as it is drawn forwardly through the water. The invention is herein illustratively described by reference to its presently preferred form as intended to be connected in the place of the conventional trolling sinker at some point along the trolling line (or leader) above the fishing lure. However, it will be recognized that certain changes with respect to details may be made without departing from the underlying features comprising the invention.

Most trolling lures, such as plugs, spoons, flies, spinners, herring, etc., perform best when trolled at a particular speed or close to an optimum speed. Consequently with a given length of line out and a given sinker weight on the line the trolling lure will tend to move along at a fairly constant depth. The difficulty with this standard procedure is that the schools of fish may lie at a greatly different depth. For instance, certain species of Pacific salmon can at times be caught on the bottom, and at other times are found near the surface or at an intermediate depth. The sports fisherman with a single conventional trolling rig in use is therefore usually faced with the necessity of changing sinker weights until he finds the correct depth on each particular occasion. This procedure is time-consuming and frequently not very productive of fish. Moreover, even though a school may be located in that manner, a change of tide or the mere passage of time can cause the school to move to a very different depth, so that the procedure must be repeated.

An object of the present invention is a trolling device which may be used in lieu of a trolling sinker, and which will automatically and in periodic manner climb and dive over considerable ranges of depth, as it is drawn through the water at any given speed. Thus if the trolling lure is connected to the end of the line it will move progressively up and down throughout a selected range of depth, and thus at least intermittently place the lure at the correct depth to bring results.

Another object of the invention is a means of adjusting the device so that the searching depth range and also the upper and lower limits of that range may be varied at will. In its disclosed form the device has adjustments by which both the upper depth level to which it climbs and the lower depth level to which it dies may be selectively changed independently of each other, and further means of adjustment by which the rate of climb or ascent and the rate of dive may be selectively adjusted, also independently of each other.

A related object is the provision of means by which such adjustments may be made easily and quickly.

In brief terms, the novel trolling device as herein disclosed comprises a body member upon which are pivotally mounted a pair of diving planes situated at respectively opposite sides of the body member, and movable between positive and negative limiting angles of attack so as to cause the device alternately to climb or dive as it is drawn forwardly through the water, depending upon the setting of said diving planes. In addition there is provided resiliently acting detent means tending to hold the diving planes in or urge them toward either of said two limiting angular positions so that the application of reversing torque thereto is necessary in order to produce a reversal in the angle of attack of such diving planes. A further essential feature of the device comprises the provision of an actuating means having a point of engagement with the trolling line located materially forwardly of the pivot axis of the diving planes, and further coupled to the diving planes so that as the device changes depth in one sense or the other, depending upon the existing setting of the diving planes, a critical depth is reached at which the angularity between the trolling line and trolling device to which it is connected becomes such that the actuating member, through said coupling, overcomes said detent means and abruptly reverses the angle of attack of the diving planes, thereby to cause said device to move in depth in the opposite sense.

Preferably said detent means comprises an overcentering spring mechanism in the form of a control member rigidly connected to the diving planes, and an overcentering resilient element acting on said member to provide resiliently yieldable force tending to hold the diving planes in either of said limiting angles of attack, subject to movement toward the opposite angle of attack as the elevation angle of the trolling line changes during progressive change of depth of the device. When the overcentering point of the mechanism is reached by such action, the resilient element abruptly snaps the diving planes to the reverse angle of attack and causes the device to change depth in the reverse sense. In this preferred embodiment of the invention the actuating member comprises an elongated, forwardly projecting arm pivotally connected to the body member of the device and coupled to the control member through a lost-motion connection by which the elongated arm and the control member are constrained to move conjointly except for a limited amount of independent or lost motion which is permitted between such arm and member for the purpose of insuring abrupt and complete reversals of the angle of attack of the diving planes at the transition points.

These and other features, objects and advantages of the invention, together with details of the preferred form of construction thereof, will become more fully evident from the following description by reference to the accompanying drawings.

Figure 5:
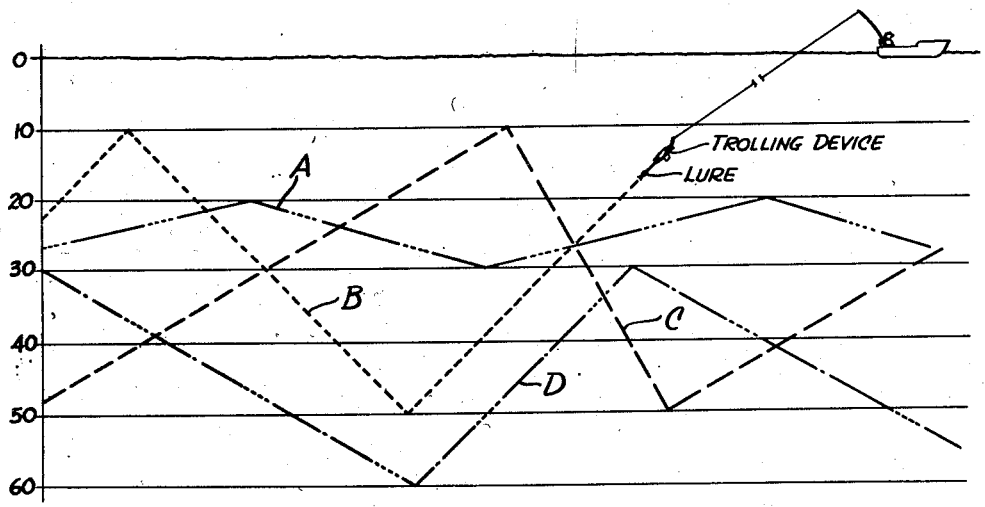
Figure 5 is a schematic diagram illustrating some of the effects which may be achieved by changing the settings of the various stops by which the diving planes are operatively positioned and controlled.
Figure 1:
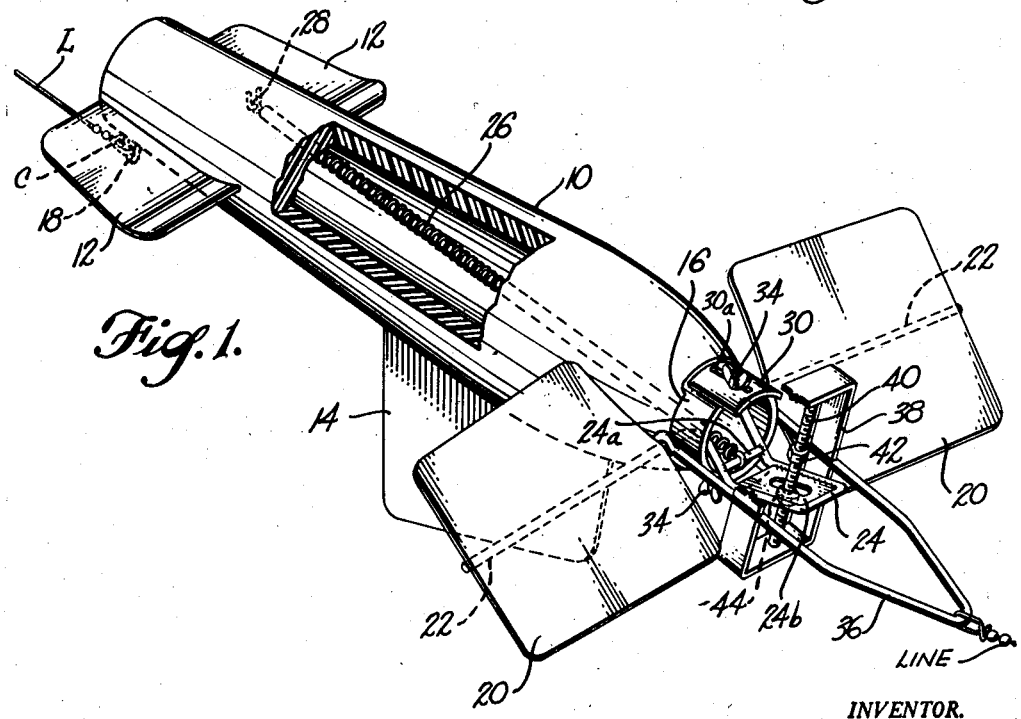
Figure 1 is a perspective view of the novel trolling device, with parts broken away for convenience of illustration.

As illustrated, the trolling device body member 10 is in the form of an elongated streamlined tubular element having stabilizing fins 12 projecting laterally from opposite sides at the trailing end thereof, and a third stabilizing fin or rudder 14 projecting downwardly from the belly portion thereof intermediate the ends of the body member. Preferably this body member is formed of light-weight plastic or similar material, and the fins may be formed of like material or of a light-weight noncorrosive metal. A metal collar or sleeve 16 projects forwardly from the nose of the body member 10 and constitutes a part thereof upon which certain elements may be mounted as hereinafter described. In order for the novel trolling device to be used in the role of a trolling sinker fastened to the trolling line ahead of a fishing plug or other lure, the body member 10 is provided with a securing loop 18 rigidly mounted near the trailing end thereof on its lower side, to which the fishing leader L may be fastened as by means of a quick-connector C. The fishing lure (not shown except in Figure 5) will then be secured to the trailing end of the leader L.

The relatively elongated and streamlined body member 10, provided with the stabilizing fins 12 and rudder 14, tends to assume a stable attitude in the water as it is drawn forwardly by means of the connecting elements to be described. The drag of the trolling lure and leader L also tends to make for stability in the attitude of the body member 10 during trolling.

The mechanism by which the device is caused to climb and dive alternately in periodic manner basically comprises means in the nature of one or more diving planes which are triggered or actuated back and forth between positive and negative angles of attack in accordance with changes in angularity of the trolling line relative to the longitudinal axis of the body member 10. In other words, the invention operates on the basis of utilizing such angularity changes to derive a force and by such force produce a displacement of means controlling the angular position of the diving planes about their transverse pivot axis so as to force said planes, against the detaining force of a resilient element incorporated in the mechanism, to assume a reverse angle of attack after a certain desired transitional depth has been reached by the device. The alternate reversals in angle of attack of the diving planes produce the zigzag paths of travel thereof, as shown by the dotted lines in Figure 5, and to be described more fully hereinafter. The different zigzag paths represent different possible types of action achieved by changes in the settings of the limit stops incorporated in the mechanism.

Referring to the details of the mechanism producing the above-described results, the two diving planes 20 are in the form of flat plates mounted with coorientation on their respective pivot shafts 22 which extend oppositely and transversely from opposite sides of the mounting sleeve 16 in which they are pivotally mounted. The pivot shafts 22 are secured to the respective diving planes 20 generally intermediate the forward and rear edges of such planes so that the forces required to move the diving planes about their common transverse pivot axis are approximately the same in one direction as in the other; in other words, the diving planes are relatively balanced with respect to control and reaction torques. The supporting pivot shafts 22 for the diving planes form a part of a control member which further comprises the control arm 24 interconnecting such shafts and projecting forwardly from such pivot axis through the opening in the mounting sleeve 16. The control arm 24 is in the form of a yoke, the sides of which, as viewed in side elevation, are angularly formed intermediate their respective ends, that is, are formed so that the projecting or outer portion of the member 24 is inclined forwardly at a more positive angle than the base portion of such member next to the shafts 22. A transverse brace 24a interconnecting the sides of the yoke-like control arm 24 serves as an anchor for one end of an overcentering spring 26 functioning in an overcentering mechanism comprising such spring and the control member 24. The opposite end of the spring 26 is anchored as by means of the element 28 to the body member 10, and is so situated that the force of the spring acting through the control member 24 on the vanes 20 tends to maintain such vanes either in forwardly declining or forwardly inclining positions on respectively opposite sides of an intermediate angular position constituting the transition point of the overcentering mechanism. At this transition point the vanes assume a substantially neutral position in which they are disposed generally parallel to the longitudinal axis of the device as a whole.

Upper and lower limit stops 30 and 32, respectively, mounted on top and bottom of the mounting sleeve 16 are engaged by the control arm member 24 in the respective positive and negative limiting angles of attack of the vanes 20. Each such limit stop is formed as a cylindrical segment mounted on the exterior surface of the mounting sleeve 16 for slidable adjustment fore and aft thereon. In order to hold such limit stops in various adjusted positions each such limit stop has a longitudinal slot (30a and 32a, respectively) receiving the stem of a wing-head screw 34 threaded into the mounting sleeve at a selected location and adapted to be tightened or loosened in order to clamp the limit stop against the mounting sleeve in any selected position, or to release such clamping pressure and permit longitudinal adjustment thereof when desired. In the particular illustration the forward portion of the body member 10 is relieved at 10a adjacent the mounting sleeve 16 to provide receiving cavities for each of the limit stops 30 and 32 in their rearward-most positions of adjustment.

As will appear from the foregoing description and the illustration of the limit stops 30 and 32, it is possible by means of adjustment in the longitudinal position of the limit stop 30 to vary the limiting positive angle of attack of the vanes 20, and by means of adjustment of the stop 32 to vary the limiting negative angle of attack of the vanes.

In order to actuate the diving planes or vanes 20 between positive and negative angles of attack in the operation of the device an actuating mechanism is provided comprising an elongated actuating arm 36 mounted on the body member 10 to pivot on a transverse axis thereon and to project generally forwardly therefrom to a point of engagement with the trolling line. In the example the actuating arm 36 is in the form of a loop or yoke the opposite ends of which are provided with eyes encircling the roots of the respective diving plane shafts 22 on the opposite sides of the mounting sleeve embraced by such actuating yoke. Furthermore, in the example the mode of engagement of the yoke 36 with the trolling line comprises a direct draft connection to such line; in other words, the actuating arm 36 serves as the means by which the trolling device is secured to the trolling line to be drawn through the water and hence to draw the leader L and the lure connected to the leader. In the example, the arm or yoke 36 serves in two capacities, namely as a connector by which the body member of the trolling device is connected to the trolling line for drawing the device through water, and as a control member engaging the trolling line utilizing the changes in angle of the trolling line relative to the body member in order to actuate the diving planes between positive and negative angles of attack, as hereinafter disclosed. Viewed broadly, however, any suitable draft connection to the trolling device and any suitable control means accomplishing the latter described operation in the manner herein disclosed may be employed for these purposes within the purview of the invention.

The actuating mechanism further comprises an open rectangular framelike member 38 the two sides of which generally disposed in parallel vertical planes in the figures are secured, intermediate their ends, respectively to the opposite sides of the arm or yoke 36 at locations generally intermediate the ends of the latter, with the plane of the frame member 38 disposed perpendicular to that of the yoke 36. A threaded post 40 interconnects the two intermediate or horizontal sides of the frame member 38 approximately midway between the upright sides of the frame member. The post 40 is thus supported by the frame member in perpendicular relationship with the general plane of the arm-yoke 36. The post 40 extends generally through the space defined within the end portion of the control arm or yoke 24. A stop plate 24b provided with a longitudinal slot through which passes the threaded post 40 is secured to the member 24 extending generally between opposite sides thereof near its outer end portion to lie generally in the plane of such end portion. The slot in the plate 24b permits relative swinging movement of the control arm 24 and the actuating arm 36. However, upper and lower limit stop nuts 42 and 44, respectively, threaded on the post 40 abut the top and bottom of the stop plate 24b at certain limits of relative displacement between the two arms. Thus the stop plate 24b, together with the post 40 and nuts 42 and 44 carried by the arm 36, serve as a lost-motion coupling between the arms 24 and 36. By means of this lost-motion coupling the two arms are constrained to move conjointly about their common pivot axis except for certain limited relative movement permitted by reason of the spacing between the limit stop nuts 42 and 44.

The amount of lost motion permitted between the control arm 24 and the actuating arm 36 may be varied by adjustably varying the spacing between the limit stop nuts 42 and 44. Moreover, the available independent adjustability of the nuts 42 and 44 permits changing the relative angles between the actuating arm 36 and the axis of the body member 10 at which the control arm 24 is moved by such actuating arm through the transitional point of the overcentering spring mechanism during upward swinging movement and downward swinging movement of such actuating arm. In other words, the limit stop nuts 42 and 44 serve as a means by which the changing elevation angle of the trolling line, representing changing level of depth of the trolling device, is converted into displacement of the control arm 24 sufficient to reverse the angle of attack of the diving planes 20.

Figure 2:
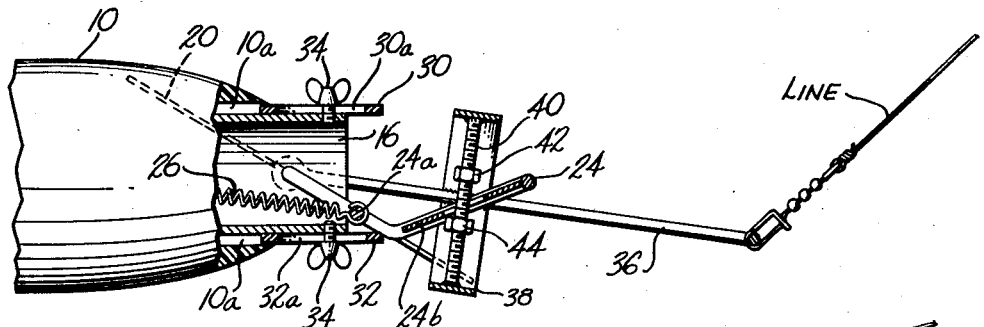
Figure 2 is a side elevation view partially in vertical section of the forward portion of the device, illustrating the control mechanism in one setting as subjected to the force of the trolling line in a given elevation angle of such line.

To illustrate the operation of the actuating mechanism by which the diving planes are positionally controlled, with the setting and adjustment of the parts shown in Figure 2 the trolling line is exerting an upward torque on the actuating arm 36, and the diving planes 20 are positioned with maximum limiting negative angle of attack as determined by the setting of the lower limit stop 32. In this position of the parts the lower limit stop nut 44 is bearing upwardly against the stop plate 24b and is thereby exerting an upward torque on the control arm 24. The overcentering spring 26 resists this torque, since its line of force in this position of the parts passes beneath the pivot axis of the arm 24. The trolling device is caused to dive to progressively greater depths, and as it does so the elevation angle of the trolling line progressively increases and exerts an ever increasing upwardly acting force on the actuating arm 36. Such force gradually and progressively displaces the control arm 24 upwardly against the yielding force of the spring 26, and the point is eventually reached, in terms of greater depth, at which any minor increase in the torque applied by the trolling line to the actuating arm 36 will carry the over- centering mechanism through its transitional point and cause the combined forces of the overcentering spring 26 and the tension in the trolling line to abruptly reverse the angle of attack of the diving planes, so as to swing the same and the parts connected thereto abruptly into the position shown in Figure 3. It can be seen that the positional adjustment of the limit stop nut 44 lengthwise of the threaded post 40 determines the point at which such transition takes place in terms of depth achieved by the trolling device by that time. Moreover, the setting of the limit stop 32 determines the rate of dive, hence the actual time required for the transition point to be reached at a given trolling speed.

Figure 3:
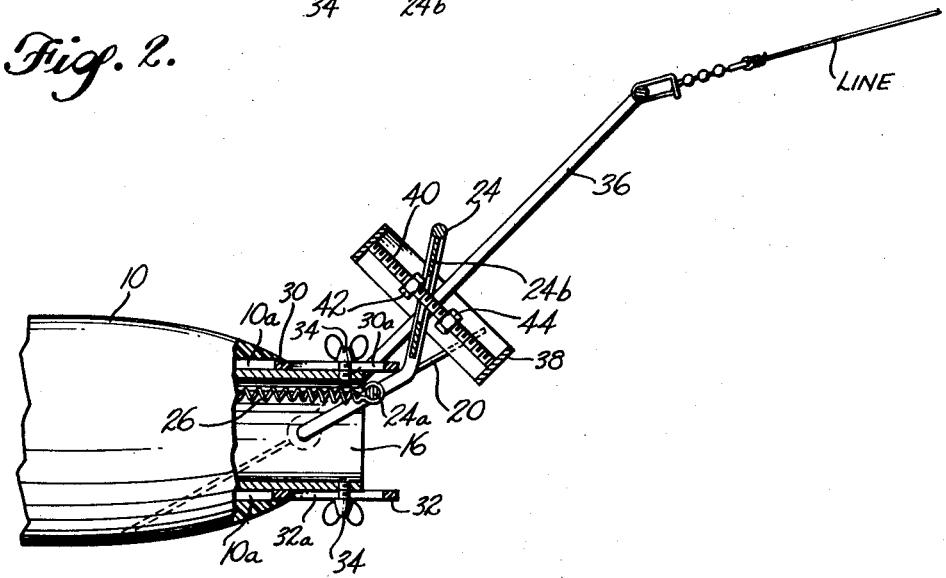
Figure 3 is a view similar to Figure 2 in which the setting is changed and the elevation angle of the line is also changed.

When the parts have been reversed in position as in Figure 3 the forwardly inclined diving planes 20 cause the device to climb, and as it does so the elevation angle of the trolling line becomes progressively smaller, with the result that the tension in the line acting on the actuating arm 36 now causes the upper limit stop nut 42 to bear downwardly on the stop plate 24a and thus exert downwardly acting torque on the control arm 24. However, due to the inherent force of the overcentering spring 26 acting oppositely on the control arm 24 and thereby on the diving planes the force of the nut 42 acting on the plate 24a is not at first sufficient to produce any relative movement of the control arm. It is necessary for the device to climb to a certain height in the water before the angularity between the trolling line and the actuating arm 36 (or the body member 10) becomes sufficient for the force of the overcentering spring 26 to be overcome and the overcentering mechanism to be reversed in position. In this case the positional adjustment of the upper limit stop nut 42 lengthwise of the post 40 is largely determinative of the upper level of depth at which the transition takes place so as to cause the device to resume a dive. Likewise the positional adjustment of the upper limit stop 30 determining the limiting positive angle of attack of the diving planes 20 is determinative of the rate of climb of the device to that transitional depth level.

Figure 4:
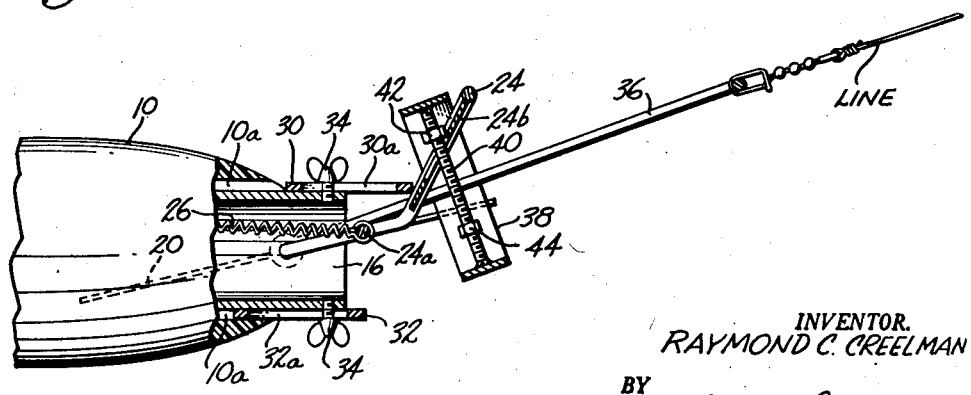
Figure 4 is a view similar to Figures 2 and 3 in which still a different setting is illustrated, and the limit stops by which the transition levels of depth have been changed and also the limit stops by which the rates of climb and descent have been changed from the settings illustrated in Figures 2 and 3.

In Figure 4 the upper and lower limit stops 30 and 32 are differently adjusted than in Figures 2 and 3, as are the upper and lower limit stop nuts 42 and 44.

Referring to Figure 5, the zigzag line A which reverses itself at upper and lower depth levels of twenty and thirty feet respectively represents one typical path of forward movement of the trolling device with a particular setting of the various limit stops employed in the diving plane positioning and actuating mechanism. Since the positively and negatively sloping sections of the path A have equal slope, this particular type of action of the device is achieved by imparting effectively equal positive and negative limiting angles of attack to the diving planes, implying corresponding adjustments of the upper and lower limit stops 30 and 32. Moreover, since the upper and lower levels of depth of the travel path A are seperated only by approximately ten feet in the example, a relatively close spacing between the limit stop nuts 42 and 44 lengthwise of the threaded post 40 is required.

In order to cause the device to track between a shallower upper limit of depth and a deeper limit of depth, such as between ten feet and fifty feet, as in plot B, and to move between these limits at substantially equal rates of climb and descent, but somewhat faster than in graph A, it is necessary to move the limit stops 30, 32 rearwardly by substantial equal effective distances and to widen the spacing between the limit stop nuts 42 and 44 by retracting these nuts by substantially equal amounts from their existing positions representing those producing the action of plot A. If now it be desired to cause the device to track between the same depth limits, namely ten and fifty feet, respectively, but to climb at a relatively slow rate and to dive at a relatively fast rate, then the limit stop 30 is moved somewhat forwardly and the limit stop 32 is moved somewhat rearwardly, whereas ideally at least the limit stop nuts 42 and 44 are allowed to remain in their existing positions producing the plot of graph B. The result of the described adjustment is plot C.

If now it is desired to cause the device to track between thirty and sixty feet, for example, and to dive slowly and climb relatively rapidly, as compared with the setting producing track B, the upper limit stop 30 is allowed to remain in its existing position since the positive slopes of the new zigzag path D are substantially equal to those of the former path B, the lower limit stop 32 is moved somewhat forwardly, the upper limit stop nut 42 is moved downwardly on the post 40, and the lower limit stop nut 44 is moved downwardly but by a lesser amount on the post 40.

There is thus provided a novel trolling device which is highly versatile in respect to the various modes of adjustment and types of action which may be achieved in producing the described depth-scanning action by which the fishing lure may be caused to move up or down in depth between variously selected upper and lower limits and at variously selected rates of climb and descent. It will be appreciated that the described results may be achieved by varying details of construction incorporating the essential features of the invention, and that the invention is not necessarily confined to the details of the disclosure, and furthermore that various combinations and subcombinations of elements are useful in carrying out the invention in its various aspects.

I claim as my invention:

1. A trolling device for automatically and periodically varying the depth at which a fishing lure is trolled in the water, said trolling device comprising a generally elongated body member, means on said body member for connection thereof to a trolling line, stabilizing elements on said body member rendering said body member relatively stable in attitude when drawn through the water by such trolling line, means including an elongated arm member pivotally mounted near the forward end of said body member to project forwardly therefrom for engagement of a projecting end portion of said arm member with the trolling line, whereby a change in elevation angle of the trolling line relative to the longitudinal axis of the elongated body member tends to produce a similar change in the angle of the arm member relative to the axis of such body member as during a progressive change in depth of the trolling device being drawn by said trolling line means comprising at least one diving plane mounted near the forward end portion of said body member for pivoting motion relative thereto about a transverse axis thereby to permit varying the angle of attack of said diving plane throughout a range including positive and negative angular limits and a substantially neutral angular position generally intermediate said limits, whereby the device may be caused to ascend or descend according to the angle of attack of said diving plane, overcentering means including a control element rigidly connected to said diving plane to vary the angle of attack thereof, and further including an overcentering resilient element anchored at one end to said body member and operatively connected at its opposite end to said control element, said resilient element and control element being cooperatively arranged for applying resilient torque to said diving plane urging the same generally toward one or the other of its angular limit positions from any angular position thereof on the same side of said neutral angular position as the particular limit position, and coupling means on said arm member and said control member constraining the two such members to swing together, whereby the angle of attack of said diving plane is changed relatively abruptly to either limiting angle by said overcentering resilient element upon completion of movement of said control element by said arm member in the same direction past the neutral position of said diving plane.

2. A trolling device for automatically and periodically varying the depth at which a fishing lure is trolled in the water, said trolling device comprising a generally elongated body member, means on said body member for connection thereof to a trolling line, stabilizing elements on said body member rendering said body member relatively stable in attitude when drawn through the water by such trolling line, means including an elongated arm member pivotally mounted near the forward end of said body member to project forwardly therefrom for engagement of a projecting end portion of said arm member with the trolling line, whereby a change in elevation angle of the trolling line relative to the longitudinal axis of the elongated body member tends to produce a similar change in the angle of the arm member relative to the axis of such body member, as during a progressive change in depth of the trolling device being drawn by said trolling line, means comprising at least one diving plane mounted near the forward end portion of said body member for pivoting motion relative thereto about a transverse axis thereby to permit varying the angle of attack of said diving plane throughout a range including positive and negative angular limits and a substantially neutral angular position generally intermediate said limits, whereby the device may be caused to ascend or descend according to the angle of attack of said diving plane, overcentering means including a control member rigidly connected to said diving plane to vary the angle of attack thereof, and further including an overcentering resilient element anchored at one end to said body member and operatively connected at its opposite end to said control member, said resilient element and control member being cooperatively arranged for applying resilient torque to said diving plane urging the same generally toward one or the other of its angular limit positions from any angular position thereof on the same side of said neutral angular position as the particular limit position, and mutually cooperative lost-motion coupling means on said arm member and said control member constraining the two such members to swing together except for limited angular movement in either sense of said arm member relative to said control member, whereby the angle of attack of said diving plane is changed relatively abruptly to either limiting angle by said overcentering resilient element upon completion of movement of said control member by said arm member in the same direction past the neutral position of said diving plane.

3. The trolling device defined in claim 2, and adjustable upper and lower limit stops for the diving plane, mounted on the body member, and means for securing the respective stops in any of various adjusted positions establishing the positive and negative limiting angles of attack of the diving plane at correspondingly different values respectively.

4. The trolling device defined in claim 3, wherein the lost-motion coupling means on the arm member and control member includes relatively adjustable lost-motion limit stops carried by one of said members and means carried by the other member alternately engageable with such stops respectively, and means for securing said lost-motion limit stops in any of various adjusted positions relative to the member carrying such stops for establishing the upper and lower limits of lost motion of such member at different values respectively relative to the other member coupled thereto by said lost-motion coupling means.

5. The trolling device defined in claim 2, wherein the lost-motion coupling means on the arm member and control member includes relatively adjustable lost-motion limit stops carried by one of said members and means carried by the other member alternately engageable with such stops, respectively, and means for securing said lost-motion limit stops in any of various adjusted positions relative to the member carrying such stops for establishing the upper and lower limits of lost motion of such member at different values respectively relative to the other member coupled thereto by said lost-motion coupling means.

6. A trolling device for automatically and periodically varying the depth at which fishing is done in the water, said trolling device comprising a body member, stabilizing means on said body member tending to render the same relatively stable in attitude when drawn through the water by connecting the forward end portion of said body member to a trolling line, means comprising at least one diving plane pivotally mounted on said body member for pivoting movement relative thereto about a transverse axis thereby to permit varying the angle of attack of said diving plane throughout a range including positive and negative angular limits and a substantially neutral angular position generally intermediate said limits, whereby the device may be caused to ascend or descend according to the angle of attack of said diving plane, overcentering means including a control member rigidly connected to said diving plane to vary the angle of attack thereof, and further including an over-centering resilient element anchored at one end to said body member and operatively connected at its opposite end to said control member, said resilient element and control member being cooperatively arranged for applying resilient torque to said diving plane urging the same generally toward one or the other of its angular limit positions from any angular position thereof on the same side of said neutral angular position as the particular limit position, and means coupled to said diving plane and engaged with the trolling line at a point spaced appreciably from the pivot axis of said diving plane for applying torque to said diving plane tending to vary the angle of attack thereof either up or down, respectively in accordance with changes in the elevation angle of the trolling line relative to said body member, the angle of attack of said diving plane being changed relatively abruptly to either limiting angle by said overcentering resilient element upon completion of movement of said control member by the trolling line in the same direction past the neutral position of said diving plane.

7. The trolling device defined in claim 6, wherein the means coupled to the diving plane and engaged with the fishing line comprises an elongated member pivotally mounted on the body member to pivot about a transverse axis thereon and project generally forwardly thereof, the projecting forward end portion of said elongated member being adapted for engagement with the trolling line for swinging of such elongated member progressively up and down with corresponding changes in the elevation angle of such trolling line, and mutually cooperative lost-motion coupling means on said elongated member and the control member constraining the two such members to swing together except for limited angular movement of said elongated member either up or down relative to said control member.

8. The trolling device defined in claim 7, and adjustable upper and lower limit stops for the diving plane, mounted on the body member, and means for securing the respective stops in any of various adjusted positions establishing different positive and negative limiting angles of attack of the diving plane respectively.

9. The trolling device defined in claim 8, wherein the lost-motion coupling means on the arm member and control member includes relatively adjustable lost-motion limit stops carried by one of said members and means carried by the other member alternately engageable with such stops respectively and means for securing said lost-motion limit stops in any of various adjusted positions relative to the member carrying such stops for establishing different upper and lower limits of lost motion of such member respectively relative to the other member coupled thereto by said lost-motion coupling means.

10. The trolling device defined in claim 6, and adjustable upper and lower limit stops for the diving plane, mounted on the body member, and means for securing the respective stops in any of various adjusted positions establishing different positive and negative limiting angles of attack of the diving plane respectively.

11. A trolling device adapted to be drawn through water by means of a trolling line and automatically to change its direction of movement in periodic fashion to follow a zigzag path during its forward movement along an average line of such movement, said device comprising an elongated body member, a plate-like deflector member pivotally mounted on said body member for relative pivotal movement about a generally transverse axis thereon throughout a range between opposite angular limits, said deflector member by its angular position relative to said body member and the line causing said device to travel forwardly in a particular direction relative to the average line of forward movement, resiliently yieldable detent means acting on said deflector member in its opposite angular limit positions and tending to hold such deflector member in either such limit position in a resiliently yieldable manner, and actuating means coupled to said deflector member and engageable with the trolling line at a point materially forwardly situated relative to said pivot axis for applying angular-position-reversing torque to said deflector member in either limit position of such member which torque progressively increases with amount of departure of the device from its average path of forward movement until such torque becomes sufficient to overcome said detent means and swing said deflector member to its opposite angular limit position.

12. A trolling device adapted to be drawn through water by means of a line and automatically to change its direction of movement in periodic fashion to follow a zigzag path during its forward movement along an average line of such movement, said device comprising an elongated body member, a plate-like deflector member pivotally mounted on said body member for relative pivotal movement about a generally transverse axis thereon throughout a range between opposite angular limits, said deflector member by its angular position relative to said body member and the line causing said device to travel forwardly in a particular direction relative to the average line of forward movement, actuating means coupled to the deflector member and engaged by the trolling line, said actuating means producing movement of the deflector member from either limit position thereof toward its opposite limit position in response to change of angle of the fishing line relative to the lure body during progressive departure of the device from its average path of forward travel, and reversible-acting resilient means urging said deflector member toward either limit position when such limit position is being approached by said deflector member.

13. The trolling device defined in claim 12, wherein the deflector member comprises a pivotal structure including a pair of substantially coplanar diving planes mounted on respectively opposite sides of the body member, and the body member is of elongated form having stabilizer planes projecting laterally therefrom tending to maintain the same in a relatively stable attitude during forward movement of the device.

14. A trolling device adapted to be drawn through water by means of a trolling line and automatically to change its direction of movement in periodic fashion to follow a zigzag path during its forward movement along an average line of such movement, said device comprising an elongated body member, a plate-like deflector member pivotally mounted on said body member for relative pivotal movement about a generally transverse axis thereon throughout a range between opposite angular limits, said deflector member by its angular position relative to said body member and the line causing said device to travel forwardly in a particular direction relative to the average line of forward movement, and actuating means coupled to the deflector member and engaged by the trolling line forwardly of the pivot axis of the deflector member, said actuating means being adapted to produce movement of the deflector member from either limit position thereof toward its opposite limit position in response to a change of angle of the fishing line relative to the lure body during progressive departure of the device from its average path of forward travel.

15. A trolling device for automatically and periodically varying the depth at which fishing is done, said device comprising a generally elongated body member of streamlined form, stabilizing surface members projecting laterally from said body member, a pair of transversely extending diving planes for said body member, means pivotally mounting said diving planes on said body member for conjoint pivotal movement of said diving planes about a common transverse axis thereon throughout a range including maximum positive and negative limiting angles of attack of said diving planes, adjustable limit stops establishing such positive and negative angular limits at independently selected positions, a control member rigidly connected to said diving planes to vary the angle of attack thereof within their range of movement, overcentering resilient means connected between said body member and said control member and so arranged relative to the latter as to urge said diving planes toward either limit position when swung toward such position through an intermediate portion of their range of movement, an actuating arm member pivotally connected to said body member to pivot about a transverse axis thereon at least in the vicinity of said diving planes pivot axis, said actuating arm member projecting generally forwardly from its connection to the lure body and being adapted near its projecting end for engagement with a trolling line drawing said device through the water, whereby changes in angle of the trolling line relative to said body member cause exertion of torque on said actuating arm, and lost-motion coupling means including complemental coupling elements on said actuating arm and said control member permitting limited free movement of said actuating arm relative to said control member in one direction and the other while constraining said arm and member to move conjointly when either said arm or said member moves relatively beyond either such limit of free movement, whereby alternately opposite changes of trolling line angle relative to said body member effect movement of said control member through said intermediate portion of diving plane movement alternately in opposite directions to permit periodic abrupt reversals in the angular position of said diving planes by said resilient means accordingly.

References Cited in the file of this patent

UNITED STATES PATENTS

| | | |
|---|---|---|
| 1,690,578 | Hammond | Nov. 6, 1928 |
| 2,542,347 | Muller | Feb. 20, 1951 |
| 2,565,099 | Simmons | Aug. 21, 1951 |
| 2,618,093 | Isaac | Nov. 18, 1952 |
| 2,679,227 | Symonds | May 25, 1954 |